United States Patent Office 2,728,746
Patented Dec. 27, 1955

2,728,746

ALPHA-HYDROXY ACRYLIC ACID POLYMERS, AND SALTS THEREOF

Cornelius C. Unruh, Rochester, N. Y., assignor to Eastman Kodak Company, Rochester, N. Y., a corporation of New Jersey No Drawing. Application March 8, 1952,
Serial No. 275,681

11 Claims. (Cl. 260—78.3)

This invention relates to alpha-hydroxy acrylic acid resinous polymers, to salts thereof, and to means for their preparation.

Resinous polymers of the hypothetical alpha-hydroxy acrylic acid would be very desirable, because of the presence of free hydroxyl and carboxyl groups. However, such polymers cannot be obtained by direct polymerization, since the monomeric $\alpha$-hydroxy acrylic acid is the unstable enol form of pyruvic acid. We have now found that polymers and copolymers of $\alpha$-hydroxy acrylic acid can be prepared as derived polymers from certain readily hydrolyzable polymers, specifically from alpha-acyloxy acrylate polymers. The derived polymers and salts of my invention are for the most part water-soluble and precipitable with acids so that they are commercially valuable as sizing and film-forming materials.

It is, accordingly, an object of the invention to provide $\alpha$-hydroxy acrylic acid polymers and salts thereof. Another object is to provide a process for preparing such polymers and salts. Other objects will become apparent hereinafter.

In accordance with my invention, I prepare $\alpha$-hydroxy acrylic acid polymers by first homopolymerizing or copolymerizing $\alpha$-acyloxy acrylates having the general formula:

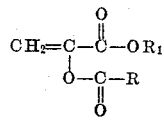

wherein R represents an alkyl group containing from 1 to 3 carbon atoms (e. g. methyl, ethyl, n-propyl and isopropyl groups) and $R_1$ represents an alkyl group containing from 1 to 4 carbon atoms (e. g. methyl, ethyl, n-propyl, isopropyl, n-butyl, etc. groups), and then subjecting the resulting polymers to alkaline hydrolysis whereby substantially complete saponification of both the alkoxyl and acyloxyl groups occurs, the resulting hydrolyzed polymer containing the recurring structural unit

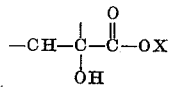

wherein X represents an atom of hydrogen, an alkali-metal atom (e. g. sodium, potassium, lithium, etc.), and then separating the alpha-hydroxyacrylic acid polymer, or salt thereof, from the reaction mixture. The corresponding ammonium salts are prepared by treating the free acids with ammonium hydroxide. The copolymers of the invention contain from 10 to 90 parts by weight of $\alpha$-hydroxy acrylic acid or salt units, the remainder of the molecule being ethylene, styrene, acrylic or methacrylic acid units. The hydrolysis is carried out in a liquid medium such as alchol, water or alcohol-water mixtures containing the alkaline hydrolyzing agent, at elevated temperatures of about 50° to 100° C., but preferably at the refluxing temperatures of the hydrolyzing reaction mixtures. The amount of the alkaline agent (e. g. sodium hydroxide, potassium hydroxide, lithium hydroxide, etc.) can vary from just enough to complete the hydrolysis of the polymer or copolymer to a considerable excess, but preferably from 2 to 5 gram-moles of the alkali-metal hydroxide to each gram-mole of the polyacrylate employed as the starting material.

Suitable polyacrylates which can be used as starting materials for preparing the hydrolyzed polymers of the invention include homopolymers of methyl $\alpha$-acetoxy acrylate, ethyl $\alpha$-acetoxy acrylate, n-propyl $\alpha$-acetoxy acrylate, n-butyl $\alpha$-acetoxy acrylate, sec. butyl $\alpha$-acetoxy acrylate, isobutyl $\alpha$-acetoxy acrylate, methyl $\alpha$-propionoxy acrylate, methyl $\alpha$-butyroxy acrylate, methyl $\alpha$-isobutyroxy acrylate, ethyl $\alpha$-propionoxy acrylate, ethyl $\alpha$-butroxy acrylate, butyl $\alpha$-butyroxy acrylate, etc. which come within the definitions of R and $R_1$, and include copolymers of the above with each other and copolymers of the above with one or more other ethylenically unsaturated monomers such as styrene, ethylene and acrylic and methacrylic esters (e. g. methyl, ethyl, propyl, isopropyl, butyl, isobutyl or sec. butyl acrylates and corresponding methacrylates. Such starting copolymers contain from about 10 to 90% by weight of one or more of the above-mentioned $\alpha$-acyloxy acrylates and can be prepared by, for example, the general process described by Kenyon et al. in U. S. Patent 2,499,393, dated March 7, 1950, and their continuation-in-part U. S. Patent 2,559,635, dated July 10, 1951.

The following examples will serve further to illustrate the manner whereby I practice my invention.

Example 1

Polyethyl $\alpha$-acetoxy acrylate was ground and passed through a 60 mesh screen, and then refluxed with a solution of potassium hydroxide in ethanol (saturated at room temperature) for a period of 3 days. The undissolved saponified polymer obtained was filtered off, rinsed well with alcohol and dried. The potassium salt thus obtained was dissolved in about 8 parts of water to give a somewhat viscous light brown solution. Concentrated hydrobromic acid was then continuously added to the solution, until it showed an acid reaction to Congo red paper. The soft, gelatinous precipitate was separated by decantation and rinsed rapidly once with 2 parts of distilled water. After decanting off the rinse water, another 2 parts of distilled water was added and the mixture gently warmed on the steam bath to give a clear, very light brown solution. This was poured slowly into a large volume of stirred methanol and the white, fibrous precipitate was extracted with methanol overnight in a Soxhlet extractor, then dried at 60° C. The polymer was redissolved in water and precipitated a second time in methanol. The precipitate was dried first at 60° C., then in a vacuum desiccator over concentrated sulfuric acid. Analysis of this product gave a residual value of 3.4% of ethoxyl and 0.3% of acetyl groups. Accordingly, the product obtained was substantially the free acid, poly $\alpha$-hydroxy acrylic acid. The ammonium salt was prepared by treating the poly $\alpha$-hydroxy acrylic acid with ammonium hydroxide.

Example 2

25 g. of a homopolymer of ethyl $\alpha$-acetoxy acrylate was ground and passed through a 40 mesh screen. This was mixed with 40 cc. of a 10% by weight solution of potassium hydroxide in a 60% by volume mixture of ethanol and water, and heated on a steam bath under reflux. Within 30 minutes the suspension became a taffy-like mass on the bottom of the flask. After one hour of heating, the supernatant solution was decanted and the residue dissolved in 150 cc. of water to give a yellow solution which was filtered. The filtrate was made acid to Congo red by the dropwise addition of concentrated hydrobromic acid while stirring. The soft precipitate was isolated by decanting the supernatant liquid and rapidly rinsed once with a little water. The highly swollen mass was then heated on the steam bath with stirring to give a tan, viscous solution. This was poured slowly into an excess of well-stirred alcohol. The white, fibrous precipitate was extracted overnight with methanol in a Soxhlet extractor, then dried at 60° C. A yield of 13 g. of product was obtained. The residual ethoxy content was 1.5% and the acetyl content was 0.0% indicating thereby that the final product was substantially poly α-hydroxy acrylic acid.

*Example 3*

Example 2 was repeated with the exception that sodium hydroxide was substituted for the potassium hydroxide, and the reaction mixture was heated for 24 hours, with stirring, on the steam bath. The acetyl content of the product was 0.0%, whereas the ethoxyl content was 1.7%. The product was substantially poly α-hydroxy acrylic acid.

*Example 4*

11 g. of a homopolymer of ethyl α-butyroxy acrylate was mixed with 150 cc. of a 10% by weight solution of potassium hydroxide in a 60% by volume mixture of ethanol in water, and refluxed for 5 hours on a steam bath. A soft cake comprising the potassium salt of poly α-hydroxyacrylic acid precipitated out and this was purified in the manner described in Example 2. A yield of 4.5 g. of product was obtained. The residual contents of ethoxyl and butyryl groups were 2.6% and 0.1%, respectively, indicating thereby that the product was poly α-hydroxy acrylic acid.

*Example 5*

13 g. of a homopolymer of n-butyl α-acetoxy acrylate was saponified in the manner described in Example 4, but the product was not completely soluble in water at this stage. It was heated, therefore, on the steam bath with a 10% aqueous solution of potassium hydroxide until a smooth dope was obtained. The polymer was isolated in the manner described in Example 2. The product had a residual acetyl content of 0.3%, and was substantially pure poly α-hydroxy acrylic acid. This was converted to the ammonium salt by treatment with water solution of ammonia.

*Example 6*

13 g. of a copolymer of the ethyl and n-butyl esters of α-acetoxy acrylic acid (ground to 20 mesh) was refluxed for 4 hours on the steam bath with a 10% by weight solution of potassium hydroxide in a 60% by volume mixture of ethanol in water. The soft precipitate was isolated and purified as described in Example 2. The product was poly α-hydroxyacrylic acid. The ammonium salt was prepared by treating the poly α-hydroxy acrylic acid with ammonium hydroxide.

*Example 7*

10 g. of a copolymer of ethyl α-acetoxy acrylate and styrene (molar ratio of the acetoxy acrylate to styrene was 1:1.3) was ground and passed through a 20 mesh screen and refluxed on the steam bath with 250 cc. of an alcohol solution of potassium hydroxide, saturated at room temperature. After 16 hours, the product was obtained as a soft cake on the bottom of the flask. This was isolated by decanting the supernatant liquid. The soft polymer was completely soluble in water. The amber colored aqueous solution was filtered and then acidified with concentrated hydrobromic acid, until it gave an acid reaction with Congo red. The highly swollen precipitate was then repeatedly washed with distilled water, until on standing for some time together with the polymer, the wash water no longer gave an acid reaction. The polymer was dried at 60° C. Analysis showed that it contained no ethoxyl and the acetyl content was negligible. The product obtained as above was a copolymer containing approximately 40% by weight of α-hydroxy acrylic acid and 60% by weight of styrene.

This polymer was not soluble in water, but when a little ammonia was added to a mixture of the polymer with water, solution readily took place. When such a solution was evaporated down, as in a coating, the residue was again water insoluble, due probably to regeneration largely of the polymeric acid from the ammonium salt on drying.

In place of the specific copolymer of ethyl α-acetoxy acrylate and styrene in the above example, there can be substituted copolymers containing the same components but in different proportions, for example, from 10 to 90% by weight of the ethyl α-acetoxy acrylate and from 90 to 10% by weight of styrene. Other starting copolymers containing any of the alkyl α-acyloxy acrylates coming within the definitions of R and R₁ of the formula with styrene, ethylene or any of the mentioned acrylic or methacrylic acid alkyl esters, wherein the proportions of the alkyl α-acyloxy acrylate is from about 10 to 90% by weight of the copolymer, can also be substituted in the above example to give corresponding copolymeric α-hydroxy acrylic acid products.

Although the reactions in the preceding examples have been illustrated as being carried out at normal pressures, it will be apparent that pressures above atmospheric can be used and also temperatures substantially higher than 100° C. under greater pressure conditions. Regarding the saponification reagents, potassium hydroxide solutions are somewhat more reactive for this purpose than, for example, sodium hydroxide solutions. The presence in such solutions of about 50 to 60% by volume of alcohol in water gives more rapid reactions than solutions of similar concentration made up in either water or alcohol alone. Other water-miscible alcohols such as methanol, ethylene glycol, etc. are also operative.

As previously indicated, the products of the invention show substantially complete saponification of both the alkoxyl and acyloxy groups. In the case of polymers consisting largely of α-hydroxy acrylic acid groups, water solubility is realized. If, however, considerable hydrophobic units (such as styrene, ethylene, etc. groups) are present in the molecular chain, then water solubility may or may not be attained, but ammonium or alkaline salts may be water soluble. Such polymeric compositions have the useful property of being water soluble per se or as their alkali metal salts, as well as the ammonium salts. Furthermore, when such solutions are made acid to excess with mineral acids, they are precipitated out of solution and are believed to form intramolecular esters or lactones. Such lactones are known to possess excellent fiber and film-forming properties. The polymers of the invention, therefore, find useful applications for the preparation of textile fibers and backings and coatings on films and foils, as well as sizing materials which can be insolubilized on the fiber in the textile and paper industries.

What I claim is:

1. A polymer of a compound having the general formula:

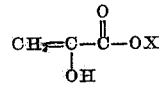

wherein X represents a member selected from the group consisting of an atom of hydrogen, an alkali metal atom and an ammonium group.

2. Poly α-hydroxyacrylic acid.
3. Potassium salt of an α-hydroxyacrylic acid polymer.
4. Sodium salt of an α-hydroxyacrylic acid polymer.

5. Ammonium salt of an α-hydroxyacrylic acid polymer.

6. A copolymer comprising from 10 to 90 parts by weight of a compound having the general formula:

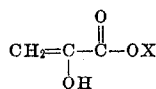

wherein X represents a member selected from the group consisting of an atom of hydrogen, an alkali metal atom and an ammonium group, and from 90 to 10 parts by weight of styrene.

7. A copolymer comprising from 10 to 90 parts by weight of α-hydroxyacrylic acid and from 90 to 10 parts by weight of styrene.

8. A process for preparing poly α-hydroxy acrylic acid which comprises heating a polymer of an α-acyloxy acrylate having the general formula:

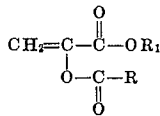

wherein R represents an alkyl group containing from 1 to 3 carbon atoms and $R_1$ represents an alkyl group containing from 1 to 4 carbon atoms, with an alkali metal hydroxide dissolved in a mixture of water and ethyl alcohol, until hydrolysis of substantially all of the acyl and acyloxyl groups is complete, neutralizing the reaction mixture, and separating the poly α-hydroxy acrylic acid from the reaction mixture.

9. A process for preparing the potassium salt of an α-hydroxy acrylic acid polymer which comprises heating a polymer of an α-acyloxy acrylate having the general formula:

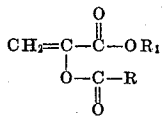

wherein R represents an alkyl group containing from 1 to 3 carbon atoms and $R_1$ represents an alkyl group containing from 1 to 4 carbon atoms, with potassium hydroxide dissolved in a mixture of water and ethyl alcohol, until hydrolysis of substantially all of the acyl and acyloxyl groups is complete, and separating the potassium salt of α-hydroxy acrylic acid polymer from the reaction mixture.

10. A process for preparing the sodium salt of an α-hydroxy acrylic acid polymer which comprises heating a polymer of an α-acyloxy acrylate having the general formula:

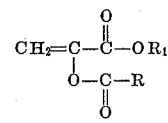

wherein R represents an alkyl group containing from 1 to 3 carbon atoms and $R_1$ represents an alkyl group containing from 1 to 4 carbon atoms, with sodium hydroxide dissolved in a mixture of water and ethyl alcohol, until hydrolysis of substantially all of the acyl and acyloxyl groups is complete, and separating the sodium salt of α-hydroxy acrylic acid polymer from the reaction mixture.

11. A process for preparing the ammonium salt of an α-hydroxy acrylic acid polymer which comprises heating a polymer of an α-acyloxy acrylate having the general formula:

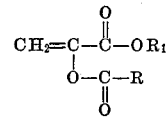

wherein R represents an alkyl group containing from 1 to 3 carbon atoms and $R_1$ represents an alkyl group containing from 1 to 4 carbon atoms, with an alkali metal hydroxide dissolved in a mixture of water and ethyl alcohol, until hydrolysis of substantially all of the acyl and acyloxyl groups is complete, neutralizing the reaction mixture and treating the separated α-hydroxy acrylic acid polymer with aqueous ammonia.

References Cited in the file of this patent

UNITED STATES PATENTS

| | | |
|---|---|---|
| 2,499,393 | Kenyon et al. | Mar. 7, 1950 |
| 2,559,635 | Kenyon et al. | July 10, 1951 |

OTHER REFERENCES

Houwink: Elastomers and plastomers, vol. III, pages 96–99 (1948), Elsevier Pub. Co., New York.